Aug. 4, 1964    R. B. POWER    3,143,729
PILOT SIGNAL CIRCUIT
Filed April 13, 1961

INVENTOR
Roy B. Power
BY
Eyre, Mann & Lucas
ATTORNEYS

United States Patent Office 3,143,729
Patented Aug. 4, 1964

3,143,729
PILOT SIGNAL CIRCUIT
Roy B. Power, Madison, N.J., assignor to Tung-Sol
Electric Inc., a corporation of Delaware
Filed Apr. 13, 1961, Ser. No. 102,774
4 Claims. (Cl. 340—253)

This invention relates to a pilot signal circuit which signals an operator whenever a load circuit is unbalanced. The invention has particular reference to a signal circuit for use on automobiles or trucks and is designed to inform the driver when one or more of the flasher lamps have been burned out or are not operating in the usual manner. While the circuit has been developed and will be described for use in trucks it will be obvious that it may be adapted to many other forms of signal circuits.

Modern signal flashing circuits used on trucks today generally include a plurality of lamps which flash on and off whenever the flasher circuit is energized. Most of these lamps can not be seen by the driver of the vehicle and hence their failure will generally go unnoticed. The lack of such a signal may cause trouble and result in accidents. The present invention provides a signal lamp which may be placed in front of the operator to give a warning signal as soon as one of the flasher lamps fails. The device inserts no inductive reactance into the circuit under normal operating conditions, but when there is a flashing lamp failure an inductive kick triggers a switching means for the signal warning lamp circuit which thereupon remains closed as long the the flasher circuit is energized.

One of the objects of this invention is to provide an improved pilot signal circuit which avoids one or more of the disadvantages and limitations of prior art arrangements.

Another object of the invention is to provide a signal at a desired position when a load circuit fails at a remote location.

Another object of the invention is to reduce the cost of signal circuits.

Another object of the invention is to produce signal operating currents without absorbing inductive energy from the power supply.

Another object of the invention is to provide a pilot signal circuit that is reliable under all load operating conditions.

The invention includes a pilot signal circuit to indicate when there is a lack of complete operating currents through a load circuit and includes equally balanced loads operated by a single source of electric power. The circuit is designed especially for signal circuits which include a modulating means such as a flasher for changing the current values to the load circuits. A ferromagnetic core is employed which is provided with opposed primary windings each connected in series with one of the load circuits and each connected to the source of power. A secondary winding is placed on the core for providing a voltage pulse whenever the currents delivered to the load circuits differ by a substantial amount. The secondary winding is connected to a controllable impedance which is connected in a warning circuit. The warning circuit is connected to the source of potential and includes a signal lamp or other warning device for informing an operator that the load circuits are unbalanced.

For a better understanding of the present invention, together with other and further objects thereof, reference is made to the following description taken in connection with the accompanying drawings.

Figure 1:
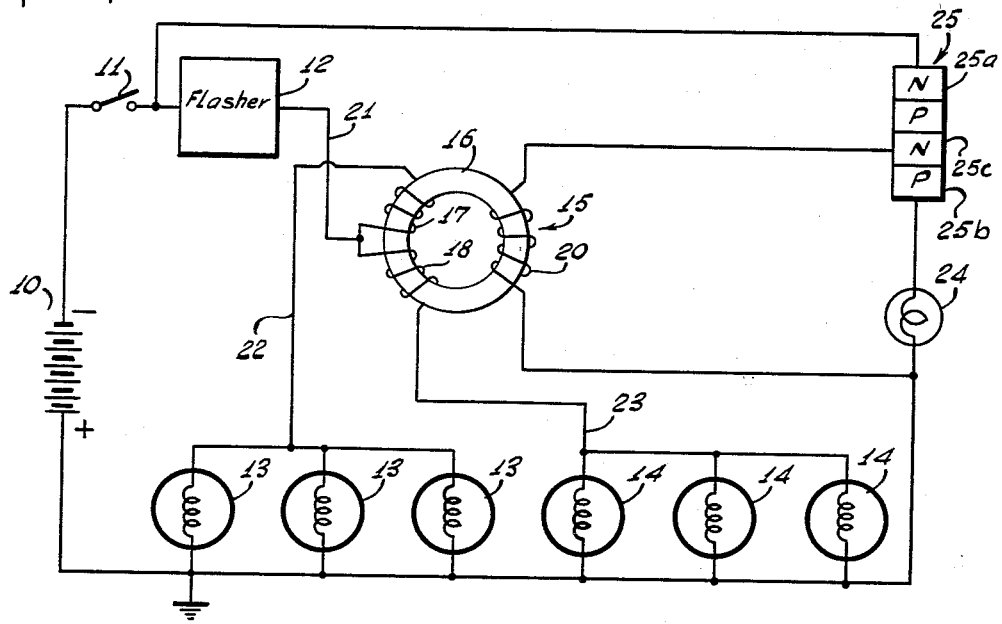
FIG. 1 is a schematic diagram of connections showing a complete circuit embodying the invention.

Referring now to FIG. 1, the circuit includes a source of potential 10 which may be a storage battery. This source of potential is connected by means of a manually operated switch 11 to a flasher device 12 which automatically switches current on and off at a predetermined rate for signalling purposes. Device 12 could be, for example, a flasher such as shown and described in Schmidinger Reissue Patent No. 24,023. The circuit also includes two banks of signal components 13 and 14. These components may be lamps or any other type of signalling apparatus but they must be substantially balanced so that each group takes the same current during normal operation. Coupling means for deriving energy for a signal circuit includes a transformer 15 having a ferromagnetic core 16, two opposed primary windings 17 and 18, and a secondary winding 20. Primary windings 17 and 18 are connected together and to a common conductor 21 which is connected to the flasher device 12. The other ends of the primary windings are connected respectively to the two loads 13 and 14 by means of conductors 22 and 23.

Secondary winding 20 is connected to a warning circuit which includes a signal lamp 24 and a controllable impedance 25. These components are connected in series between ground and one terminal of switch 11. The controllable impedance 25 is symbolized in FIG. 1 as a four zone semiconductor having an anode 25a, a cathode 25b, and a control electrode 25c which controls the resistance of this device. Under normal circumstances the resistance of the component is infinite and no current flows through the circuit but when a voltage pulse of sufficient magnitude is applied to electrode 25c, the device conducts and current flows from the source of potential 10 through the pilot signal 24 and back to the other side of the source. This current energizes the lamp 24 (or other warning signal) and thereby notifies the operator that one or more of the lamps 13 or 14 has been burned out and is not operating properly.

The controllable impedance 25 is a component which, when triggered by a voltage pulse on its control terminal, continues to pass current between its anode and cathode even though the triggering pulse is of short duration. This means that as long as switch 11 is closed (after a triggering pulse) the pilot lamp 24 provides illumination to inform the operator that something is wrong with the signal lamps. It should be noted that under normal operating conditions windings 17 and 18 on core 16 do not introduce any inductive reactance into the operating circuit because these two windings are opposed to each other and the flux that normally might be produced by either one of the windings is cancelled by the magnetomotive force generated by the other winding. Because of this fact there is practically no loss in voltage or current introduced into the signal circuit by this additional warning device.

Figure 2:
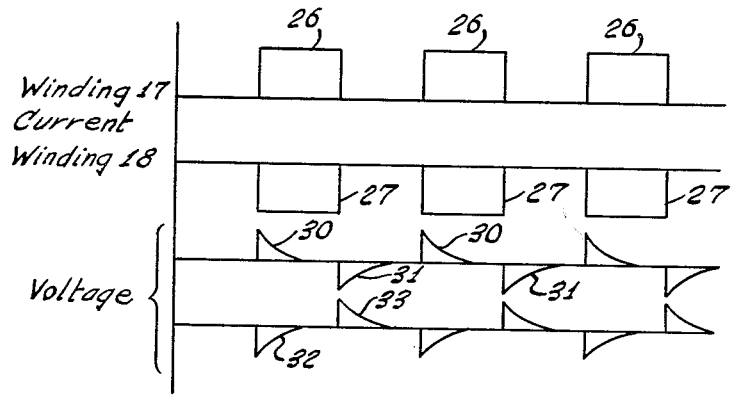
FIG. 2 is a graph showing some of the currents and voltages that may exist in the circuit of FIG. 1.

FIG. 2 shows some of the current and voltage wave forms which are present during the normal operation of this circuit. Square-topped waves 26 represent the current which flows through coil 17. Coil 18 passes current in the opposite direction and these pulses are represented by negative-going waves 27. If the loads 13 and 14 are balanced, the current pulses 26 will be balanced by the current pulses 27 and there will be no induced magnetic field and therefore no voltage generated in winding 20. However, if one of the lamps 14 should burn out, the currents through windings 17 and 18 will be unbalanced and sharp pulses 30 and 31 will be generated in winding 20 and the controllable impedance 25 will be triggered and pass current to lamp 24. If one of the lamps 13 burns out and passes no current, the unbalanced currents in windings 17 and 18 will generate magnetic flux in the core 16 and produce voltage pulses in winding 20 indicated in FIG. 2 by wave shapes 32 and 33. These pulses also trigger impedance 25 to produce a warning signal.

Figure 3:
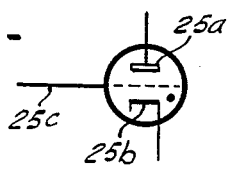
FIG. 3 is a schematic diagram showing a thyratron which may be substituted for the controlled impedance shown in FIG. 1.

The controllable impedance 25 of FIG. 1 is preferably a four zone germanium device commercially identified as a TS–1182 and described in a paper by Fidler, Carlat and Wegener presented at the 1960 Electronics Components Conference, reprints of which are available from the "Proceedings." A silicon controlled rectifier could also be used as the controllable impedance 25 or such impedance could be replaced by a thyratron component as shown in FIG. 3, having an anode 25a, a cathode 25b, and a triggering electrode 25c which controls the device and transforms it from a non-conductive to a conductive condition. Thyratrons are well known in the art and need not be described here in detail.

Although in the circuit shown and described there are three lamps in each of two balanced load circuits, obviously the invention could be employed for detection of failure of a lesser or greater number of lamps whether in two load circuits or in a greater number of load circuits. For example each lamp could be connected to the flasher device through a separate primary winding of few turns provided the number of turns and the directions of the windings were such as to yield no net magnetic flux in the case when all lamps were functioning.

Other variations within the scope of the invention will be obvious to those skilled in the art. For example, to compensate for slight mismatch of the load circuit a small positive bias could be applied to the control element of the controllable impedance in the warning circuit as from a resistance divider connected across the warning circuit.

From the above description it will be evident that a novel pilot signal circuit has been described and illustrated which will show a warning signal only when a balanced load is unbalanced by the failure of one or more of its components.

The foregoing disclosure and drawings are merely illustrative of the principles of this invention and are not to be interpreted in a limiting sense. The only limitations are to be determined from the scope of the appended claims.

I claim:

1. A pilot signal for showing the existence of unbalanced operating currents through a load circuit comprising, a pair of normally balanced lamp load circuits operated by a source of direct current electric power, modulating means for changing the current values applied to the loads, a ferromagnetic core carrying two opposed primary windings, each connected in series wtih one of said load circuits and each connected to the source of electric power, a secondary winding also on said core for providing a voltage pulse whenever the currents through the loads differ by a substantial amount, and a warning circuit connected to the source of power and including a signal lamp and a controllable impedance, said impedance coupled to the secondary winding and normally non-conductive but adapted to light the signal lamp when actuated by a pulse and to maintain the signal lamp lighted.

2. A pilot signal circuit as claimed in claim 1 wherein a solid state thyratron is the controllable impedance.

3. A pilot signal circuit as claimed in claim 1 wherein a gaseous discharge device is the controllable impedance.

4. A pilot signal circuit as claimed in claim 1 wherein said modulating means is a flasher device.

References Cited in the file of this patent

UNITED STATES PATENTS

| | | |
|---|---|---|
| 2,285,912 | De Monte | June 9, 1942 |
| 2,572,094 | Bailey | Oct. 23, 1951 |
| 2,652,553 | Hollins | Sept. 15, 1953 |
| 2,719,288 | Young | Sept. 27, 1955 |
| 2,824,296 | Hecht et al. | Feb. 18, 1958 |